Oct. 16, 1923.

J. E. DIVEN 1,470,713

THERMOS CONTAINER

Filed Feb. 8, 1922

Inventor
Jennie E. Diven.

By Harry C. Schroeder
Attorney

Patented Oct. 16, 1923.

1,470,713

UNITED STATES PATENT OFFICE.

JENNIE E. DIVEN, OF OAKLAND, CALIFORNIA.

THERMOS CONTAINER.

Application filed February 8, 1922. Serial No. 535,058.

*To all whom it may concern:*

Be it known that I, JENNIE E. DIVEN, a citizen of the United States, residing at Oakland, in the county of Alameda and State of California, have invented certain new and useful Improvements in Thermos Containers, of which the following is a specification.

My invention is a thermos container, particularly useful for containing bricks of ice cream.

Referring to the annexed drawing in which my invention is illustrated and which forms a part of this specification:

Figure 1:
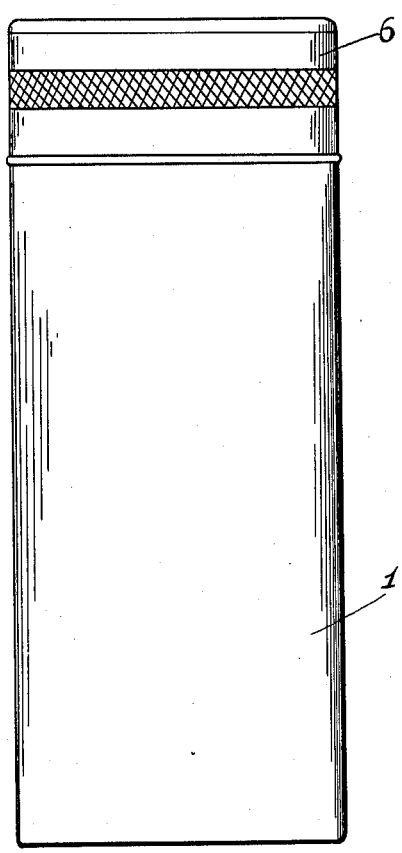
Figure 1 is a side elevation of my thermos container.
Figure 2:
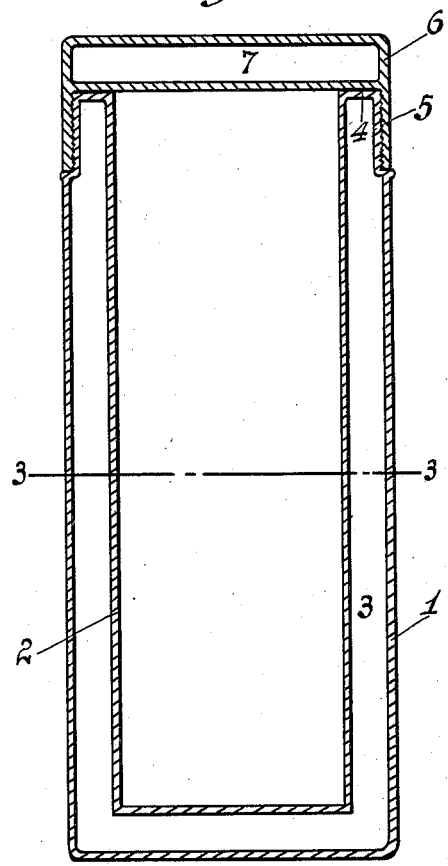
Figure 2 is a longitudinal section of my thermos container.
Figure 3:
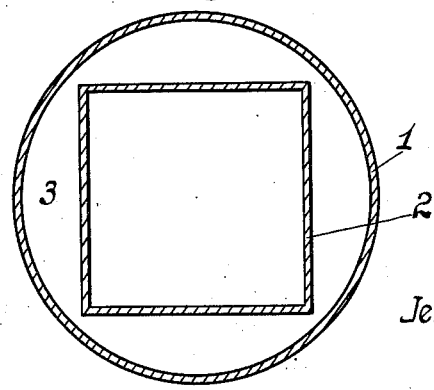
Figure 3 is a cross section of my thermos container taken on line 3—3 of Figure 2.

My thermos container includes an outer vessel 1, preferably cylindrical in shape, and an inner vessel 2 which is square in cross section and rectangular in longitudinal section and of such size as will receive an ordinary brick of ice cream. The vessel 2 is spaced inwardly from the vessel 1, providing a vacuum chamber 3 therebetween, and the two vessels are joined at the top by a wall 4. The upper end of the vessel 1 is formed with an externally threaded reduced neck 5 on which screws a cap 6 in the top of which is a vacuum chamber 7.

Having described my invention, I claim:

A thermos container including an outer cylindrical vessel, an inner vessel spaced from said outer vessel and extending to the same height as the outer vessel, said outer vessel having a reduced neck at its upper end, a horizontal plate connecting the outer and inner vessels and providing a chamber between the vessels and a cap engaging the neck of the outer vessel, said cap being formed with a chamber in the top thereof, said chamber extending over the neck and horizontal plate.

In testimony whereof I affix my signature.

JENNIE E. DIVEN.